A. GILMORE.
Potato-Digger.

No. 60,501.

2 Sheets—Sheet 1.

Patented Dec. 18, 1866

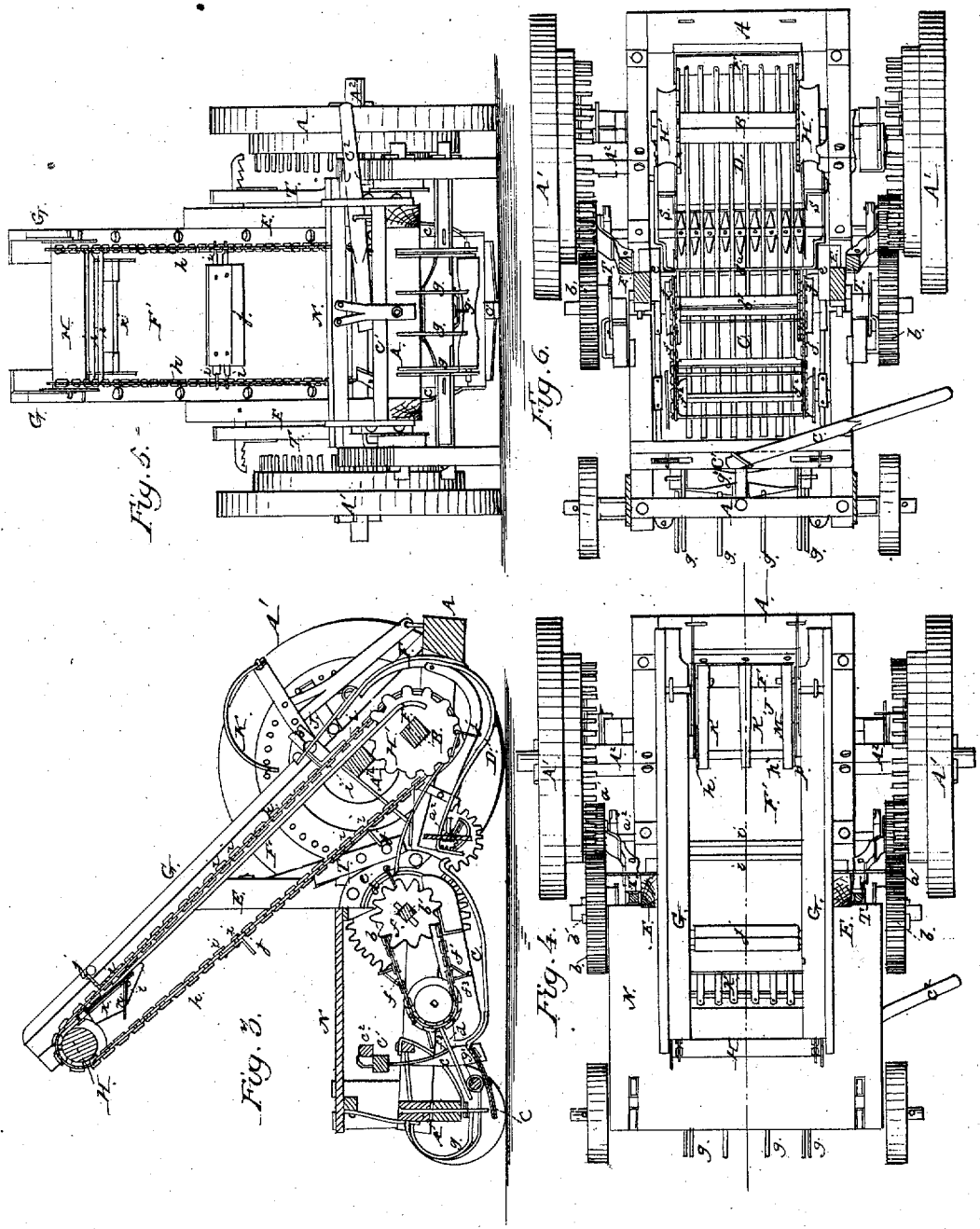

United States Patent Office.

IMPROVEMENT IN POTATO DIGGERS.

ALLEN GILMORE, OF FORT ATKINSON, WISCONSIN.

Letters Patent No. 60,501, dated December 18, 1866.

The Schedule referred to in these Letters Patent and making part of the same.

TO ALL WHOM IT MAY CONCERN:

Be it known that I, ALLEN GILMORE, of Fort Atkinson, in the county of Jefferson, and State of Wisconsin, have invented a new and improved Potato Digger; and I do hereby declare that the following is a full, clear, and exact description thereof, reference being had to the accompanying drawings, making a part of this specification, in which—

Figure 1:
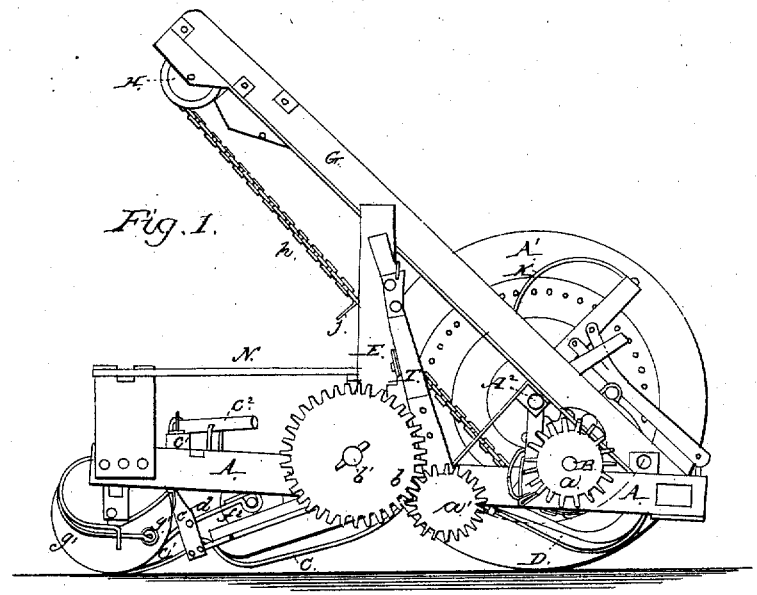
Figure 2:
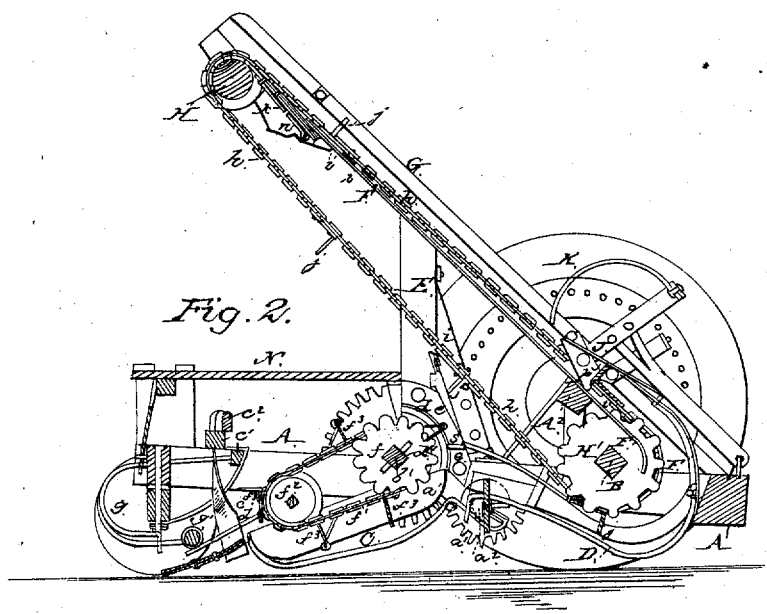

Figure 1 is an elevation of one side of the machine, with one of the largest carriage-wheels removed.
Figure 2 is a longitudinal section taken in a vertical plane through the centre of the machine.
Figure 3, sheet 2, is a similar view of the same parts, showing the shovel elevated.
Figure 4, sheet 2, is a top view of the machine.
Figure 5, sheet 2, is an elevation of the front part of the machine.
Figure 6, sheet 2, is a plan view of the machine with the elevator removed.

Similar letters of reference indicate corresponding parts in the several figures.

This invention relates to certain novel improvements on machines which are designed for digging potatoes, and separating them from their vines and from the earth. It consists, mainly, in the employment of endless rakes in conjunction with sieves, and a shovel or scoop, which are mounted in a carriage, and so arranged that when the carriage is moved forward over the hills, the potatoes will be dug up and the earth separated from them, after which they will be elevated and separated from their vines, and finally deposited into a suitable receptacle upon the front part of the carriage, as will be hereinafter described. It also consists in the arrangement of comb teeth and a roller over the scoop or shovel, for the purpose of detaching the potatoes from their vines, as they are moved backward upon the screen or sieve, as will be hereinafter described. It also consists in providing for separating the small potatoes from the largest ones during the operation of elevating them to their point of discharge, as will be hereinafter described.

To enable others skilled in the art to understand my invention, I will describe its construction and operation.

In the accompanying drawings, A represents the main frame of the carriage, which is supported nearly in a horizontal position upon two large driving-wheels, A' A', near its rear end, and upon two smaller guide-wheels at its front ends. The rear wheels $A^1$ are applied to a transverse axle, $A^2$, which is secured rigidly to standards projecting from the upper side of the frame A, and on the inner faces of these wheels, and concentric to the axes thereof, spur-teeth are applied, which engage with the teeth of spur-wheels, $a\ a$, on a transverse shaft, B. The wheels $a\ a$ are applied to their shaft B, by means of ratchets and pawls, in such manner that when the machine is moved forward shaft B will be rotated, but when the machine is moved backward said shaft will not rotate. The front supporting wheels are applied to an axle, which is centrally connected to the front cross-beam of frame A by a king bolt, and to this axle the draught-pole is attached. The spurs on the largest wheels, A', also engage with pinion spur-wheels, $a'\ a'$, on a transverse shaft, $a^2$, which extends transversely across the frame A, beneath this frame, and at a point which is between two sieves or screens, C and D, as shown in figs. 2, 3, and 6. This shaft, $a^2$, is armed with teeth, which are used to throw the potatoes, etc., from the forward screen, C, upon the front part of the rear screen D. The spur-wheels $a^1$ engage with the teeth of spur-wheels $b\ b$, which are applied upon a transverse shaft, $b'$, which is supported in bearings upon the longitudinal side beams of frame A, and forward of the shaft $a^2$. The spur-wheels $a'\ a'$ and $b\ b$ are applied to their respective shafts by means of pawls and ratchets, so that when the machine is backed said shafts will not be rotated. The fender or screen C consists of longitudinal bars, arranged at proper distances apart, and curved downward, as shown in figs. 1 and 2. The front ends of said screen bars are secured rigidly to a scoop or shovel, C', which inclines forward, so as to enter the hills of potatoes and pass beneath the latter as the machine is moved forward. The screen has side plates secured to it, which prevent lateral escape of the potatoes. At or near the front end of screen C two standards, $c\ c$, are secured to its sides, which project upward, and are suitably secured to a transverse beam, $c^1$, above the frame A. To this beam $c^1$ a lever, $c^2$, is applied, which has its fulcrum upon frame A, by means of which lever the attendant can raise or depress the front part of the screen C and the shovel C'. To the standards $c\ c$ the front ends of two longitudinal rods, $d\ d$, are secured, the rear ends of which rods are secured to segments, $d'\ d'$, that are pivoted concentrically to the axle $b'$. The rear end of the screen C is also suitably secured to the segments $d'$, and supported thereby beneath said axle. Immediately behind the segments $d'$ bearings, $e\ e$, are secured to the frame A and standards E, against which the segments impinge, and by means of which the backward strain upon the shovel $C'$ is resisted, thus relieving the axle or shaft $b'$ from undue strain when the machine is in operation. Upon the shaft $b'$ two drums, $f$, are secured, over which pass chains, $f^1$, that have secured to them rakes or blades, as shown in figs. 2 and 6; these endless chains proceed forward, and pass around drums, $f^2$, which are secured upon a shaft that extends transversely over the forward part of screen C, and has its bearings thereupon. The rake teeth or blades $f^3$, which are secured to the endless chains, are caused to revolve when the machine is moved forward, and to rake the potatoes over the screen C, thus depriving the potatoes of most of the earth taken up by the shovel $C'$. From the front transverse beam of frame A a number of teeth, $g$, project forward and downward, as shown in figs. 1, 2, and 5. These teeth constitute a comb for arresting the potato vines while the rake teeth upon the endless chains $f^1$ detach the potatoes. Just in rear of these teeth, a roller, $g'$, is arranged and supported upon spring arms; this roller presses the vines and earth downward, and assists in arresting the vines during the action of the rakes or blades upon said endless chains. The said comb, $g$, compels the vines to enter the machine, roots forward, so that the latter are presented to the rakes and carriers in a proper manner. The rakes and blades on the chains $f^1$ move the potatoes, etc., backward, and, with the assistance of the teeth on shaft $a^2$, they are deposited into the screen D, which inclines backward, and is curved at the rear part, as shown clearly in figs. 1, 2, and 3. This screen, D, is constructed of longitudinal rods and side pieces, substantially as described for screen C, and is suitably secured to the frame A, so as to be movable or stationary, as may be desired. The rear end of the screen D curves upward concentrically to the axis of the shaft B, and secured to a curved guard, F, which extends upward, and projects over the lower end of the bottom board of an inclined elevator, as shown in figs. 2 and 3. The elevator consists of two inclined beams, G G, which are secured at their rear ends to the rear part of frame A, and extend upward and forward. These beams are supported upon frame A by the perpendicular standards, E, and to these beams the board or bottom F' is secured, and also a flanged drum, H, is supported at their upper ends. Over the drum H and drums, H' H', upon the shaft B, endless chains, $h\ h$, pass, to which transverse rods, $i\ i$, are secured in pairs at proper intervals apart; these cross-rods serve to keep the chains $h\ h$ apart, and also as means for attaching the elevating blades $j\ j$, which elevate the potatoes to the highest point of the machine and then discharge them. The potatoes, together with the loose vines, are carried up from screen D, beneath a loaded gate or valve, J, the front end of which rests upon the bottom F', and the rear end is hinged to the beams G G, and when the potatoes and vines have passed forward of this gate, the vines are caught by a rake, K, and caused to fall backward over gate J and guard F upon the ground in rear of the machine, while the potatoes, which are now free from earth and vines, are carried upward over the drum H, and deposited in a suitable receptacle placed upon the platform, N. The smallest potatoes may be separated from the largest by applying a screen of suitable fineness near the upper end of the inclined bottom F', as shown at $k$ in the drawings. When it is not desired to so separate the potatoes, the hinged apron, $n$, can be closed and fastened, as shown in fig. 2, when all the potatoes, large and small, will pass upward and fall into one receptacle. The rake teeth K are secured to a vibrating frame, which is pivoted at its rear end to the frame A, and which is supported upon the bottom of the elevator by means of lifters, $p\ p$, which are acted upon by the rods $i\ i$, and caused to lift the rake teeth over the blades or carriers $j\ j$, as these latter successively pass from beneath the hinged gate J. To prevent the teeth of the conveyor, which is arranged over screen G, from clogging, I employ a hinged clearer, S, shown in figs. 2, 3, and 6. This clearer is pivoted to the frame A at its rear part, and acts, by its own gravity, upon the blades and teeth of said conveyor. On both sides of the frame A, and pivoted to the standards E E, are levers, T, the lower forked ends of which embrace the hubs of pinion spur-wheels, $a'\ a'$; by means of said levers, the spur-wheels $a'$ can be disengaged from the spurs on the main driving-wheels.

Having described my invention, what I claim as new, and desire to secure by Letters Patent, is—

1. The combination of shovel screen C, screen D, and revolving toothed shaft $a^2$, with carriers, $f^3 f^3$, applied to a carriage, A, and operating substantially as described.

2. The arrangement of comb teeth over the shovel $C'$, in combination with the carriers $f^3 f^3$, substantially as described.

3. The arrangement of a pressure roller, $g'$, in front of the carriers $f^3$, and over the shovel $C'$, substantially as described.

4. Sustaining the shovel screen C against backward strain, when said screen is suspended at its rear part from a shaft, $b'$, by means of segments $d'\ d'$ and bearings $e\ e$, substantially as described.

5. The clearer S, in combination with the carriers $f^2 f^3$, substantially as described.

6. Conducting the potatoes from the screen D upward and forward, and delivering them at a point which is near the front part of the machine, by means substantially as described.

7. The use of a rake, K, for separating the vines from the potatoes, said rake being arranged upon an elevator and caused to discharge the vines over gate J and guard F, substantially as described.

8. The application of a screen, $k$, to the inclined bottom of the elevator for separating the smaller from the larger potatoes, substantially as described.

9. The construction of the screen D with a guard, F, upon its rear end, substantially as and for the purposes described.

ALLEN GILMORE.

Witnesses:
 THOMAS CRANE,
 J. D. CLAPP.